United States Patent [19]

Biblin et al.

[11] 4,004,626
[45] Jan. 25, 1977

[54] SELF-SEALING, SELF-LOCKING THREADED FASTENER

[75] Inventors: Daniel L. Biblin, Morris Township; Joseph R. Preziosi, Clark, both of N.J.

[73] Assignee: Amerace Corporation, New York, N.Y.

[22] Filed: June 6, 1975

[21] Appl. No.: 584,475

[52] U.S. Cl. .................................. 151/7; 85/1 JP
[51] Int. Cl.² ........................................ F16B 39/24
[58] Field of Search ............... 151/7, 19 R, 14 DW, 151/14.5; 85/1 JP

[56] References Cited

UNITED STATES PATENTS

| 154,851 | 9/1874 | Dittman | 151/7 |
|---|---|---|---|
| 267,862 | 11/1882 | Fletcher | 151/7 |
| 271,365 | 1/1883 | Rodney | 151/7 |
| 1,016,746 | 2/1912 | Herzog | 151/14.5 |
| 1,604,298 | 10/1926 | Neitzel | 151/7 |
| 2,872,961 | 2/1959 | Mills et al. | 151/7 |
| 3,004,776 | 10/1961 | Sebardt | 151/7 |
| 3,275,054 | 9/1966 | Ohl | 151/7 |
| 3,316,952 | 5/1967 | Hollinger | 151/7 |
| 3,572,414 | 3/1971 | Onufer | 151/7 |
| 3,635,272 | 1/1972 | Scheffer | 151/7 |

FOREIGN PATENTS OR APPLICATIONS

| 8,026 | 4/1912 | United Kingdom | 151/7 |
|---|---|---|---|
| 541,969 | 12/1941 | United Kingdom | 151/7 |
| 569,550 | 5/1945 | United Kingdom | 151/7 |
| 852,757 | 11/1960 | United Kingdom | 151/7 |

Primary Examiner—Roy D. Frazier
Assistant Examiner—Rodney H. Bonck
Attorney, Agent, or Firm—S. Michael Bender; Richard A. Craig

[57] ABSTRACT

A self-sealing, self-locking nut in which the nut body includes an annular recess within which there is located an annular member of resilient sealing and locking material, such as a fluoroplastic, and compression-retention means integral with the nut body and including a radially inward extension of the clamping surface of the nut body, the extension being located beneath the annular member of resilient sealing and locking material and below the clamping surface such that upon engaging the fastener with a complementary threaded element and tightening the clamping surface extension against a workpiece, axial clamping forces tend to move the extension upwardly toward the remainder of the clamping surface, thereby essentially completely confining the annular member within the nut body and compressing the annular member axially while contracting the inside diameter of the annular member to establish a seal along the complementary threaded element and a prevailing-torque lock between the nut body and the complementary threaded element.

6 Claims, 9 Drawing Figures

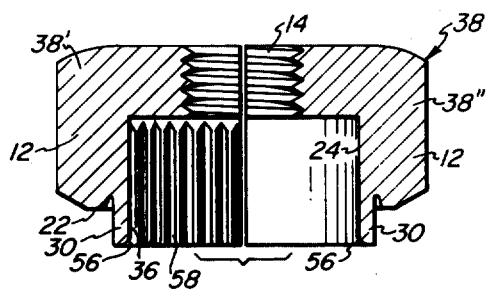
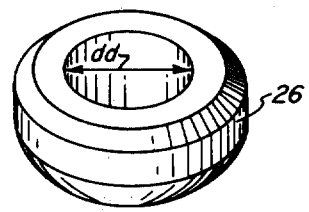
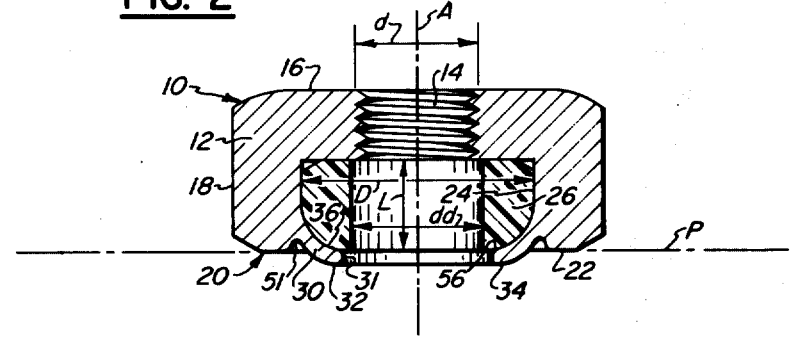
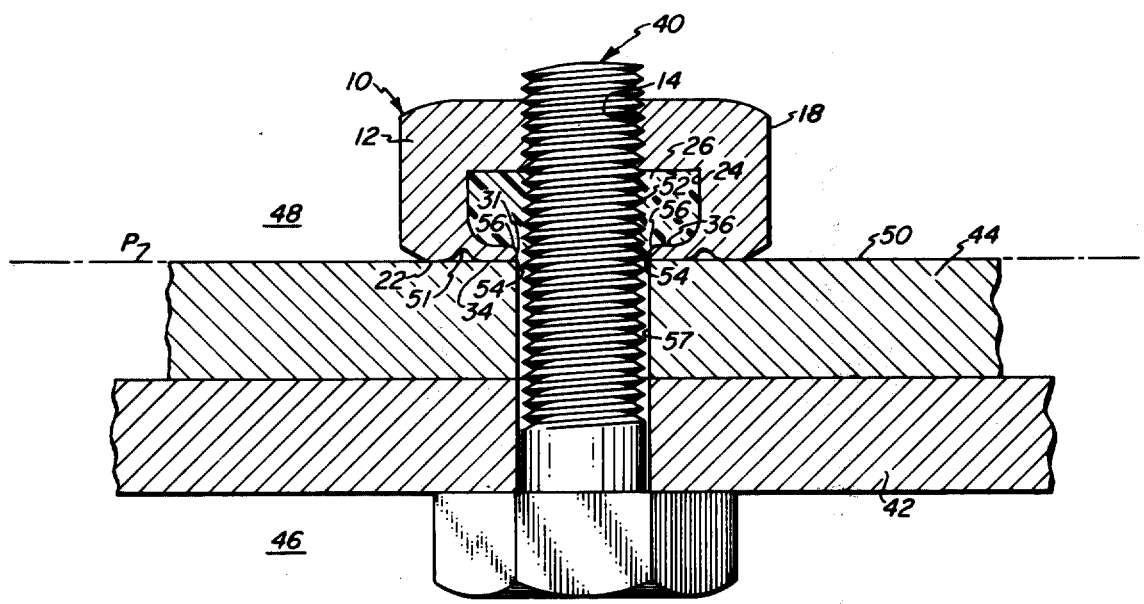

SELF-SEALING, SELF-LOCKING THREADED FASTENER

The present invention relates generally to threaded fasteners and pertains, more specifically to threaded fasteners of the type which, when installed, creates a seal against leakage paths around the base, or clamping surface, of the fastener as well as along the threads of a complementary fastener element. The fastener also exhibits a self-locking feature.

Self-sealing fasteners have found widespread commercial acceptance and have been constructed in a variety of configurations. Many of these fasteners include self-locking features, as well as self-sealing characteristics. Recently, the need has arisen for a self-sealing, self-locking threaded fastener having a relatively simple construction capable of operation at elevated temperatures, i.e., in the vicinity of 450° F, without failure of either the seal or the locking characteristic.

It is therefore an object of the invention to provide a self-sealing, self-locking threaded fastener in which both the seal and the self-locking characteristic remain intact at elevated operating temperatures.

Another object of the invention is to provide a self-sealing threaded fastener employing a sealing member fabricated of a synthetic resin material of the type providing good sealing characteristics.

Still another object of the invention is to provide a self-sealing threaded fastener in which the sealing material is confined within the fastener and the flow of the sealing material is controlled, during installation, to enable displacement of the sealing material only into predetermined designated locations.

A further object of the invention is to provide a self-sealing, self-locking threaded fastener which can be reused and will reseal upon reuse.

A still further object of the invention is to provide a self-sealing, self-locking threaded fastener which is relatively simple in construction and can be fabricated economically using present manufacturing techniques and readily available materials.

The above objects, as well as still further objects and advantages, are attained by the present invention, which may be described briefly as a self-sealing, self-locking fastener comprising a nut body including a threaded aperture having a prescribed overall diameter, and a clamping surface, at least a portion of which surface lies in a clamping plane, an annular recess, in the nut body generally coaxial with the threaded aperture, the recess having a diameter greater than the prescribed overall diameter and extending axially between the threaded aperture and the clamping surface, an annular member of resilient sealing and locking material, such as a fluoroplastic, in the recess, the annular member having an inside diameter no smaller than approximately the prescribed overall diameter and extending axially from the threaded aperture toward the clamping plane, and compression-retention means integral with the nut body for establishing an extension of the clamping surface radially inwardly approximately to the inside diameter of the annular member and extending axially beyond the clamping plane in a direction away from the threaded aperture such that the annular member is retained within the recess between the threaded aperture and the compression-retention means, whereby, upon engaging the fastener with a complementary threaded element and tightening the extension of the clamping surface provided by the compression-retention means against a workpiece, axial clamping forces upon the extension will move the extension into the clamping plane, thereby essentially completely confining the annular member within the nut body and compressing the annular member axially while contracting the inside diameter thereof to establish a seal along the complementary threaded element and a prevailing-torque lock between the nut body and the complementary threaded element.

The invention will be more fully understood, while still further objects and advantages thereof will become apparent, by reference to the following detailed description of embodiments of the invention illustrated in the accompanying drawing, in which:

FIG. 1 is a cross-sectional view of a threaded fastener constructed in accordance with the invention;

FIG. 2 is a cross-sectional view of a component part of the threaded fastener, illustrating alternative constructions;

FIG. 3 is a perspective view of another component part of the threaded fastener;

FIG. 4 is a cross-sectional view of the threaded fastener installed upon a complementary threaded element;

Figure 6:
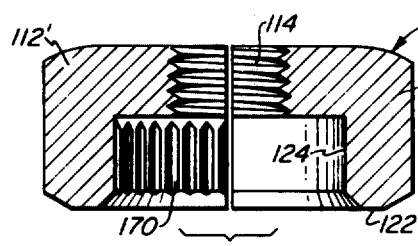
FIG. 6 is a cross-sectional view of a component part of the threaded fastener of FIG. 5, illustrating alternative constructions.

Referring now to the drawing, and especially to FIG. 1 thereof, a threaded fastener constructed in accordance with the invention is illustrated in the form of a nut 10 having a nut body 12 which includes a threaded aperture 14 extending downwardly into body 12 from upper surface 16 of the body. The outer peripheral surface 18 of the body has a hexagonal wrenching configuration, as is now well-known in the art of fasteners. The lower surface of the body 12 includes a clamping surface 20 which has a portion 22 lying in a clamping plane P.

Aperture 14 has a central axis A and includes a prescribed overall diameter $d$, which is actually the major diameter of the thread in aperture 14. An annular recess 24 in the nut body 12 is generally coaxial with threaded aperture 14 and has a diameter D greater than the prescribed overall diameter $d$ of the aperture. Recess 24 extends axially downwardly between the aperture 14 and the clamping surface 20.

An annular member of resilient sealing and locking material in the form of an insert 26 is located in the recess 24. Insert 26 has an inside diameter $dd$ no smaller than approximately diameter $d$ of the aperture 14, an overall outside diameter approximately the same as diameter D of the recess 24, and an axial length L extending downwardly toward clamping plane P.

Insert 26 is positively retained in place within recess 24 by compression-retention means integral with nut body 12 and illustrated in the form of a skirt 30 unitary with the body 12 at the lower surface thereof. Skirt 30 extends radially inwardly to inner annular edge 31 and axially downwardly and includes an outside surface 32 which carries an extension 34 of clamping surface 20, extension 34 extending radially inwardly to an inside diameter slightly greater than inside diameter *dd* of the insert 26 (as shown in FIG. 1), and axially downwardly, in a direction away from threaded aperture 14, beyond clamping plane P such that insert 26 is retained within the recess 24. An inside surface 36 of skirt 30 is juxtaposed with insert 26.

Preferably, nut body 12 is constructed of a metal, such as steel, and the insert 26 is fabricated of a resilient synthetic resin material. Turning to FIGS. 2 and 3, a nut body blank 38 is first constructed with skirt 30 extending axially downwardly, as seen in FIG. 2. Insert 26 preferably is molded in the form of a complete annulus, as seen in FIG. 3. Insert 26 is placed within recess 24 and skirt 30 is then permanently deformed over the lower end of the insert to attain the assembled nut 10, as illustrated in FIG. 1.

Turning now to FIG. 4, nut 10 is shown installed upon a complementary threaded element in the form of bolt 40 so as to fasten together workpieces 42 and 44 and at the same time seal off area 46 from area 48. As nut 10 is advanced along bolt 40, extension 34 of clamping surface 20 will first come into contact with the surface 50 of workpiece 44. As the nut 10 is tightened against workpiece 44, axial clamping forces on extension 34 will deform skirt 30, until the remainder of the clamping surface 20, in the form of clamping surface portion 22, comes into contact with surface 50 of workpiece 44, effectively moving surface 32 of extension 34 into clamping plane P. During this deformation of skirt 30, as a comparison of FIGS. 1 and 2 reveals, the inside diameter of extension 34 is slightly reduced, to a value which is less than its original diameter, but which is not as small as diameter *dd*. Since the insert 26 previously essentially filled recess 24 the relative upward movement of skirt 30 into recess 24 will compress the insert axially, causing contraction of the inside diameter *dd* thereof and forcing the material of insert 26 into the thread of the bolt. Upward movement of skirt 30 and proper seating of clamping surface 20 on surface 50 of workpiece 44 is facilitated by annular groove 51 in the lower surface of nut body 12. In this manner, a seal is established along the interface 52 between the insert 26 and bolt 40. The confinement of the insert 26 by the nut body 12 and the unitary skirt 30 assures that the material of the insert flows against the interface 52 to establish the appropriate seal. At the same time, the engagement of the material of insert 26 with the bolt thread at interface 52 establishes a prevailing-torque locking mechanism between the nut 10 and the bolt 40.

It is noted that the inside surface 36 of skirt 30 has a radius at the inner annular edge 31 so as to provide a curved surface 56 which facilitates movement of the material of insert 26 downwardly between edge 31 and the bolt 40 to establish a base seal at 54. Hence, nut 10 provides both a thread seal at 52 and a base seal at 54, while establishing a prevailing-torque type self-locking characteristic.

In addition to the controlled movement of the material of insert 26 attained during installation of the nut by virtue of the positive confinement of insert 26 within recess 24, between the skirt 30 and the upper end of the recess, the positive, almost complete confinement of the insert after installation enables the material of insert 26 to be chosen from synthetic resin materials having good sealing characteristics throughout a temperature range which includes higher service temperatures. Without such essentially complete confinement, the material could soften and flow into unfilled spaces, thereby defeating an effective seal. Among those synthetic resin materials having good sealing characteristics rendering them suitable for use in fabricating insert 26 are fluoroplastic materials. Nuts 10 manufactured with inserts 26 of the fluoroplastic Teflon have been subjected to operating temperatures as high as 450° F without loss of sealing capabilities.

Furthermore, the arrangement whereby the insert 26 is located within the recess 24 and above the skirt 30 assures that the skirt will contact the surface 50 of workpiece 44 prior to any contact between the material of insert 26 and workpieces 44. In this manner, the material of insert 26 is unable to be displaced into any area other than the predetermined locations designated by the construction of the nut body and skirt. For example, the material is not free to flow between the clamping surface 20 and the surface 50 of workpiece 44. It is noted that hole 57 in the workpiece 44, through which bolt 40 passes, is made small enough to assure confinement of the material of insert 26 during installation and during service only to the predetermined designated locations. Hole 57 may even be threaded to interengage the thread of bolt 40 to assure that the material of insert 26 will not be free to flow downwardly between bolt 40 and hole 57.

Although the compressive forces generated in the insert 26 are usually sufficient to prevent relative rotation between the insert and nut body 12, interlocking means may be provided in order to assure that any such relative rotation is precluded. Thus, in FIG. 2, two alternative constructions are illustrated for nut body blank 38. In the left-hand portion 38', an interlocking means is illustrated in the form of serrations 58 on inside surface 36 of skirt 30 and on the wall of recess 24. In the right-hand portion 38'', no interlocking means is present and only the compressive forces generated in insert 26 will be relied upon to prevent relative rotation between the insert and the nut body.

Figure 5:
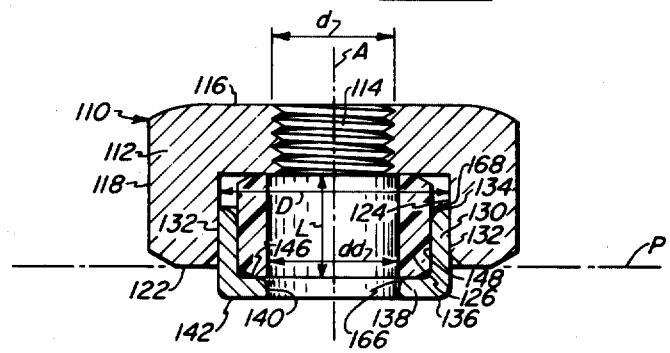
FIG. 5 is a cross-sectional view of another threaded fastener constructed in accordance with the invention.

Referring now to FIG. 5, another embodiment of the invention is illustrated in the form of nut 110 having a nut body 112 which includes a threaded aperture 114 extending downwardly into body 112 from upper surface 116 of the body. The outer peripheral surface 118 of the body has a conventional hexagonal wrenching configuration. The lower surface of the nut body 112 includes a clamping surface portion 122 lying in a clamping plane P.

Aperture 114 has a central axis A and includes a prescribed overall diameter $d$, which is actually the major diameter of the thread in aperture 114. An annular recess 124 in the nut body 112 is generally coaxial with threaded aperture 114 and has a diameter D greater than the prescribed overall diameter $d$ of the aperture. Recess 124 extends axially downwardly between the aperture 114 and the clamping surface portion 122.

An annular member of resilient sealing and locking material in the form of an insert 126 is located in the recess 124. Insert 126 has an inside diameter *dd* no smaller than approximately diameter $d$ of the aperture 114, an overall outside diameter approximately the same as diameter D of the recess 124, and an axial length L extending downwardly, in this instance beyond clamping plane P.

Insert 126 is positively retained in place within recess 124 by compression-retention means integral with nut body 112 and is illustrated in the form of a sleeve 130 integral with nut body 112 by virtue of an interference fit between the sleeve 130 and the wall of recess 124 at 132, adjacent the first end 134 of the sleeve. Sleeve 130 has an axial length, between first end 134 and second end 136 thereof, no greater than approximately the axial length of the recess 124 between the aperture 114 and the lower surface of the nut body.

The sleeve 130 is located in recess 124 such that the second end 136 is spaced axially downwardly from the clamping plane P. A flange 138 at the second end 136 extends radially inwardly to an inner annular edge 140 having a diameter no smaller than approximately the prescribed overall diameter $d$ of aperture 114. Flange 138 has an outside surface which constitutes a radially inward extension 142 of the clamping surface of the nut, and an inside surface 146 juxtaposed with the insert 126. Sleeve 130 also has an inside surface 148 juxtaposed with insert 126.

Figure 7:
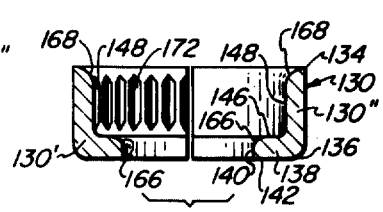
FIG. 7 is a cross-sectional view of another component part of the threaded fastener of FIG. 5, illustrating alternative constructions.
Figure 8:
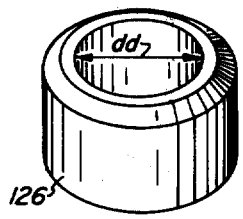
FIG. 8 is a perspective view of still another component part of the threaded fastener of FIG. 5.

Turning to FIGS. 6 through 8, nut 110 is fabricated by assembling the three component parts thereof; namely, nut body 112, insert 126 and the sleeve 130, by placing the insert 126 within sleeve 130, upon the flange 138 thereof, and then pressing the sleeve into the recess 124 until the insert comes to rest against the upper end of the recess. Nut body 112 and sleeve 130 are fabricated of a metal, such as steel, while insert 126 is molded of a fluoroplastic material, such as Teflon. The relative dimensions of the outer diameter of the sleeve 130 and the diameter D of the recess 124 establish an interference fit between the sleeve and the nut body 112 which renders the sleeve integral with the nut body.

Figure 9:
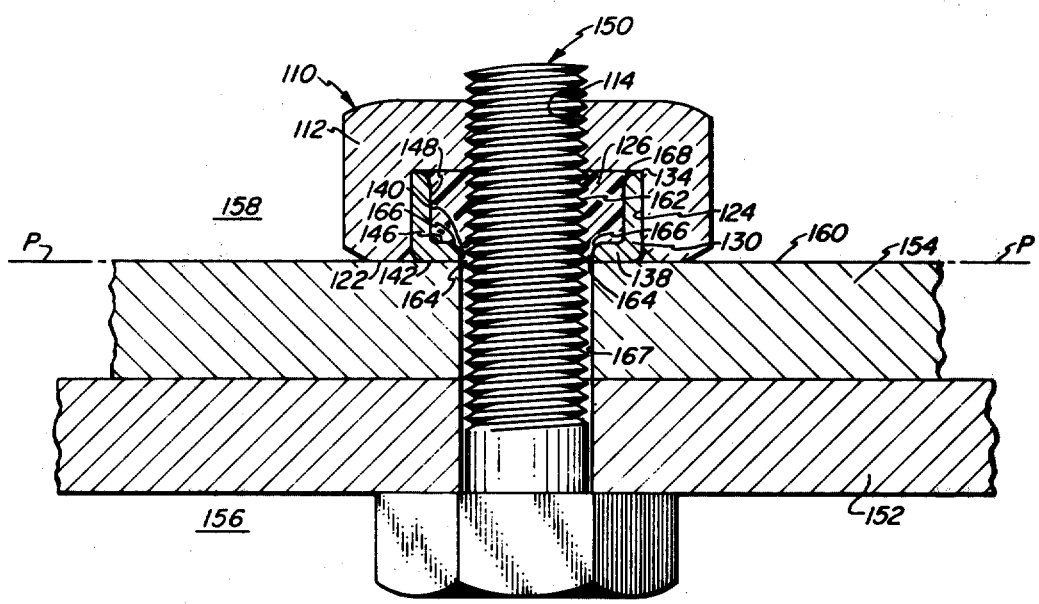
FIG. 9 is a cross-sectional view of the threaded fastener of FIG. 5, installed upon a complementary threaded element.

Referring now to FIG. 9, nut 110 is installed upon a complementary threaded element in the form of bolt 150 so as to fasten together workpieces 152 and 154 and at the same time seal off area 156 from area 158. As nut 110 is advanced along bolt 150, extension 142 of the clamping surface of the nut will first come into contact with the surface 160 of workpiece 154. As the nut 110 is tightened against workpiece 154, axial clamping forces on extension 142 will telescope sleeve 130 into recess 124 until the remainder of the clamping surface, in the form of portion 122, becomes seated against surface 160 of workpiece 154, effectively moving the outside surface of extension 142 into clamping plane P. Since insert 126 previously essentially filled the portion of the recess 124 between the flange 138 and the upper end of the recess, the relative upward movement of sleeve 130 into recess 124 will compress the insert axially, causing contraction of the inside diameter $dd$ thereof and forcing the material of insert 126 against the thread of the bolt 150. In this manner, a seal is established along the interface 162 between insert 126 and bolt 150, while a prevailing-torque locking mechanism is provided between the nut 110 and bolt 150.

The inside surface 146 of flange 138 has a radius at the inner annular edge 140 so as to provide a curved surface 166 which facilitates movement of the material of insert 126 downwardly between edge 140 and the bolt 150 to establish a base seal at 164. Hence, nut 110 also provides both a thread seal at 162 and a base seal at 164, while establishing a prevailing-torque type self-locking characteristic. Hole 167 in workpiece 154 is made small enough to assure confinement of the material of insert 126 only to predetermined designated locations and preclude downward flow of the material between the bolt 150 and hole 167 during both installation and service.

It is noted that the inside surface 148 of sleeve 130 has a radius at the first end 134 of the sleeve to provide a curved surface 168 for facilitating direction of the material of insert 126 radially inwardly during telescopic movement of the sleeve 130 into recess 124 and thereby preclude unwanted trapping of such material between end 134 and the upper end of the recess in the nut body.

The construction of nut 110 provides the desirable positive confinement of insert 126 within recess 124 and attains the benefits thereof, as outlined above in connection with the description of nut 10.

Although the compressive forces generated in the insert 126, together with the interference fit between the sleeve 130 and the wall of recess 124, are usually sufficient to prevent relative rotation between the insert and the sleeve, and between the sleeve and the nut body, interlocking means may be provided in order to assure that any such relative rotation is precluded. In nut 110, the alternative of employing interlocking means is illustrated in the form of serrations 170 in the wall of recess 124 and serrations 172 in the inside surface 148 of the sleeve 130, in the left-hand nut body portion 112', illustrated in FIG. 6, and in the lefthand sleeve portion 130', illustrated in FIG. 7. The righthand nut body portion 112" and the sleeve portion 130" illustrate an embodiment which does not employ such positive interlocking means.

Both nuts 10 and 110 have a relatively simple construction which is readily fabricated using economical available manufacturing techniques. The nuts provide effective thread and base seals, as well as a prevailing-torque self-locking mechanism, all of which can withstand relatively high operating temperatures and enable the nuts to be reused through removal and reinstallation.

It is to be understood that the above detailed description of embodiments of the invention is provided by way of example only. Various details of design and construction may be modified without departing from the true spirit and scope of the invention, as set forth in the appended claims.

The embodiments of the invention in which an exclusive property or privilege is claimed are defined as follows:

1. A self-sealing, self-locking fastener comprising:
   a unitary metallic nut body including an internally threaded portion, the thread having a root of prescribed diameter and an axis, and an immovable plane annular clamping surface surrounding and perpendicular to the axis and axially spaced and facing away from said threaded portion and in and defining a clamping plane;
   an annular recess in the nut body generally coaxial with the threaded portion, said recess having an inside surfaces located outside the envelope of the root of the thread and facing the thread axis and extending axially from said threaded portion toward the clamping plane, no part of said nut body being radially between said inside surface and the thread axis;

said nut body further having compression-retention means unitary with the threaded portion and having a radially inwardly extending deformable annular flange surrounding the axis and having a first surface facing said threaded portion and merging with said inside surface of said recess, a second surface facing away from said threaded portion and closer to the axis than said immovable plane annular clamping surface, said plane clamping surface and said second surface of said flange being joined by a groove, facilitating deformation of said flange, and an annular third surface confronting the axis and joining said first and second flange surfaces to provide said flange with an inner diameter, when said fastener is fully seated on a workpiece, slightly greater than said root diameter, and said second surface initially extending beyond the clamping plane in the axial direction away from the threaded portion;

and an annular member of resilient sealing and locking material, such as a fluoroplastic, retained within the recess between said threaded portion and said first surface of said flange, said annular member having an inside surface adapted for free initial reception of a complementary threaded element and having a portion of initial diameter no smaller than approximately said root diameter and extending axially from said threaded portion toward the clamping plane;

whereby, upon engaging the fastener with the complementary threaded element passing through a hole in the workpiece and tightening the flange against the workpiece, axial clamping force exerted by the workpiece on said second surface of the flange will deform said flange axially toward said threaded portion until said second surface of said flange is in the clamping plane, thereby compressing the annular member axially between said first surface of said flange and said threaded portion while contracting the inside surface thereof to establish a seal along, and locking relationship with, the complementary threaded and forcing material of the annular member against the workpiece in an annular space between the flange and the complementary threaded element to establish a seal between the annular member and the workpiece.

2. The invention of claim 1 wherein the juncture between said first and third flange surfaces is curved to facilitate movement of material of the annular member into the annular space between the flange and the complementary threaded element.

3. The invention of claim 1 wherein said flange is circumferentially continuous.

4. The invention of claim 1 wherein said inside surface of said recess is cylindrical and coaxial with said thread.

5. The invention of claim 4 including interlocking means for precluding relative rotation between the annular member of resilient material and the nut body.

6. The invention of claim 5 wherein said interlocking means includes serrations on said inside surface.

* * * * *